Aug. 23, 1966 R. A. FELL 3,268,676
SEGMENTED TIMER DEVICE AND WIPER CARRIAGE WITH MEANS TO
BOAST THE CARRIAGE WHEN CHANGING SEGMENTS
Filed Feb. 10, 1964
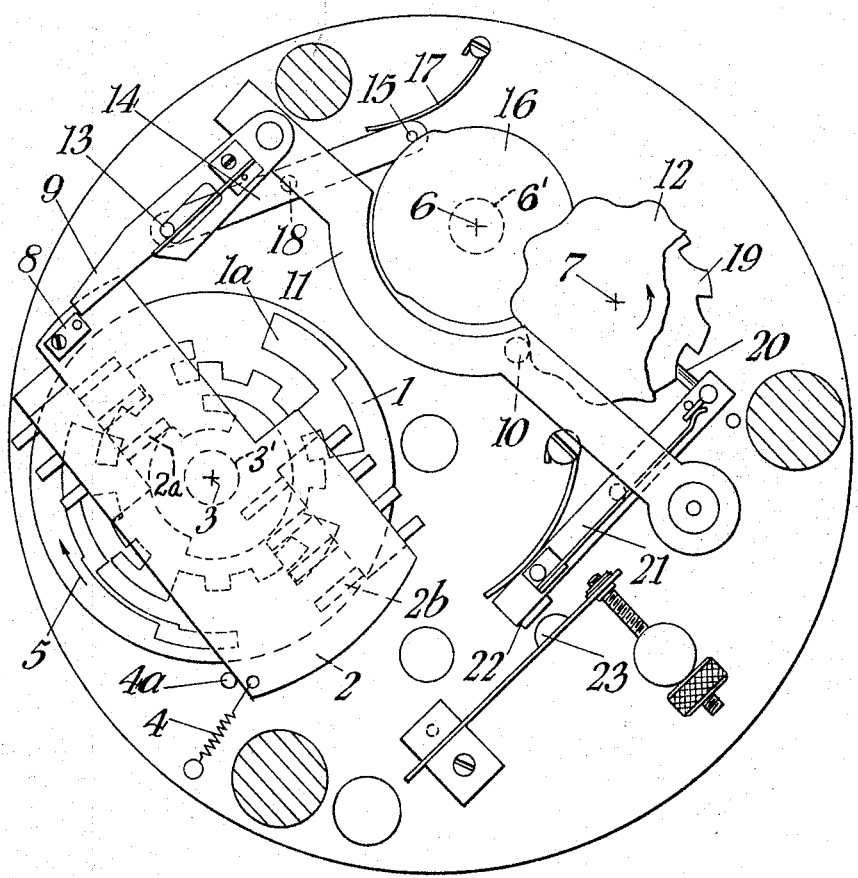

United States Patent Office
3,268,676
Patented August 23, 1966

3,268,676
SEGMENTED TIMER DEVICE AND WIPER CARRIAGE WITH MEANS TO BOOST THE CARRIAGE WHEN CHANGING SEGMENTS
Robert Andrew Fell, London, England, assignor to A. & M. Fell Limited, London, England
Filed Feb. 10, 1964, Ser. No. 343,566
Claims priority, application Great Britain, Feb. 21, 1963, 7,093/63
7 Claims. (Cl. 200—37)

This invention relates to position sensing mechanisms, and in particular to mechanisms for electrically sensing the position of a slowly rotatable shaft.

A typical example is in systems for data recording in aircraft, when it is essential that a continuous time record be kept. This may be done by sensing once every minute the positions of discs on shafts moving with the hands of a clock. In such an application it will be realized that a disc rotating once in 24 hours only moves through 15 minutes of arc in one minute of time so that at a change of hour it is essential that the changeover for the electrical sensing contact be completed in the space of 15 minutes of arc. With a conventional gear drive it is almost impossible to restrict backlash below this figure so that some means has to be found of accentuating the difference to avoid an incorrect sensing. A similar problem may arise in other applications, e.g. in the electrical reading of multi-dial counters or meters when it may be difficult accurately to sense electrically the change-over from one sector, of 36° in decimal systems, to the next within a few minutes of arc.

It is an object of the invention to provide means for resolving correctly the ambiguity that may arise in such circumstances.

The invention accordingly consists in a mechanism for sensing electrically the position of a slowly rotatable shaft, the said shaft carrying a member being divided at least in part into a series of equal sectors each having a characteristic set of electrical contacts for co-operation with sensing contacts to indicate which sector lies beneath the sensing contacts when sensing circuitry is energized, comprising a second shaft rotating once for each sector of the slowly rotatable shaft, and means sensitive to the completion of a rotation by the said second shaft for causing relative rotation between the member on the slowly rotatable shaft and the sensing contacts so that upon completion of one sector the sensing contacts are advanced clearly into the adjacent sector.

Preferably, the sensing contacts are arranged to be rocked by the said means about the axis of the slowly rotatable shaft.

Conveniently, the said second shaft carries a cam adapted to move a reciprocating element into a path wherein it contacts an abutment on a carrier for the sensing contacts to move the said carrier against the action of a spring and allow it to return.

The reciprocating element may be driven by a cam arranged to reciprocate the said element once in each sensing cycle, so that sensing is carried out when the said element is near its advanced position, whereby when the said element is in contact with the contact carrier, the latter is in advanced position for sensing.

The carrier may be arranged to be advanced during a number of sensing cycles after the changeover of sectors.

In a clock digitiser, the slowly rotating shaft could rotate once in 24 hours, the second shaft once per hour, and the reciprocating element could advance once per minute and be arranged to rock the sensing contact carrier for each of the first 15 or 20 minutes of each hour.

The invention will be further described with reference to the accompanying drawing, which is a plan view, partially cut away, of part of the drive of a digitiser for a clock.

In the mechanism shown in the drawing, a disc 1 is mounted on a shaft 3' which rotates once in 24 hours. The disc 1 carries thereon printed circuitry 1a to enable its position to be sensed by electrical contacts 2a and 2b carried on a contact carrier 2 which is oscillatable about the axis 3 of the disc 1 and urged by a spring 4 to a normal position defined by a stop pin 4a. The disc 1 rotate clockwise as indicated by the arrow 5. The disc 1 is divided into twenty four sectors of 15° and each sector carries a distinctive set of printed circuitry tracks on seven concentric rings so that successive sectors indicate, when sensed by the contacts 2a and 2b, the time in hours on the binary scale. It will be appreciated that since the contacts 2a and 2b sense three rings on one side of axis 3 and four rings on the other side, then each of the sectors, for sensing purposes is composed on the respective portions of the rings, and is not identical with the geometrical sectors of the disc.

The minutes are similarly sensed by groups of fixed contacts co-operating with discs rotating on axes 6 and 7, the discs rotating once per hour and once in ten minutes respectively. On these two discs there is no difficulty in differentiating between the sectors in the course of one minute of time since the discs rotate through 6° and 36° respectively in this time.

However, with the disc 1 the rotation in one minute of time is only fifteen minutes of arc and it would be extremely difficult, if not impossible, to obtain an unambiguous changeover from one set of tracks to another within this very small angle. It is for this purpose that the carrier 2 is made oscillatable about the axis 3 so that after the sensing immediately preceding the changeover the carrier is advanced into the next sensing sector on the disc. This advanced position is maintained at each minute change for a period of time; in the present case 20 minutes.

For this purpose the contact carrier 2 carries a projection 8 adapted to be engaged by a pawl 9 continuously reciprocated with a period of one minute by means of a follower 10 on an arm 11 co-operating with a cam 12 rotating with the disc about the axis 7. At the normal time of sensing the follower 10 is riding over a peak of the cam 12 so that if the pawl 9 is in engagement with the projection 8 the carrier 2 is advanced relative to the disc 1. The pawl 9 is normally out of engagement with the projection 8. The pawl 9 is pivoted on the arm 11 and has a slot therein co-operating with a pin 13 on a lever 14, the other end of the lever 14 carrying a follower 15 engageable with a cam 16 mounted on a shaft 6' rotating once per hour about the axis 6 and arranged to lift the follower 15 against the action of spring 17 during the sixtieth minute of an hour, i.e. immediately preceding the first sensing after a changeover of sector on the disc 1, thus causing the lever 14 to pivot about axis 18 and pull the pawl into a path to intersect with projection 8. The pawl is maintained in this path for about the first 20 minutes of the hour and the cam 16 then allows the pin to drop down and pivot the lever 14 to move the pawl into a path passing clear of the projection 8 so that sensing in the normal position on the disc 1 then continues for the remainder of the hour, this position being defined by the stop pin 4a.

Also rotating once in ten minutes about the axis 7 is a further cam 19 engaged by a follower 20 mounted on a lever 21 carrying contact 22 and spring urged to a position wherein the contact 22 engages contact 23 to initiate the sensing cycle by means of circuitry not illustrated. It will be appreciated from the form of cam 19 that the follower 20 enables a very rapid making of the contacts 22 and 23 so that there is an unambiguous initiation of the sensing cycle with a minimum of sparking on the contacts 22 and 23. The contacts are then parted slowly and the cycle allowed to repeat at minute intervals.

Various modifications may be made within the scope of the invention.

Thus it is possible for the relative motion between the disc 1 and the contact carrier 2 to be made by providing a lost motion connection in the drive to the disc 1 and causing the disc to be advanced very rapidly in the last minute of each hour and retained in that position until such time as the lost motion is made up by the drive.

I claim:

1. A mechanism for electrically sensing the angular position of a slowly rotatable shaft, said mechanism comprising a member mounted on the slowly rotatable shaft for rotation therewith, said member being divided at least in part into a series of angularly equal sectors, each sector carrying a characteristic set of electrical contacts, sensing means including sensing contacts cooperable successively with the said characteristic sets of electric contact, a second shaft rotating one revolution for each sector of the member mounted on the slowly rotatable shaft, means for causing relative angular movement about the axis of the slowly rotatable shaft between the sensing contacts and the member to advance the sensing contacts relative to the slowly rotatable shaft, and actuating means carried by said second shaft for actuating the relative motion causing means upon the completion of each revolution by the said second shaft whereby, upon completion of a sector of rotation by the slowly rotatable shaft and a complete revolution by the second shaft, the sensing contacts are advanced relative to the slowly rotatable shaft so that the sensing contacts make unambiguously with the characteristic set of contacts in the succeeding sector.

2. A mechanism as claimed in claim 1, in which the sensing means includes a contact carrier upon which the sensing contacts are mounted, the carrier being mounted for rocking about the axis of the slowly rotatable shaft, said relative motion causing means including means for rocking the carrier.

3. A mechanism as claimed in claim 2, wherein the means for rocking the carrier comprises a reciprocating element and an abutment on the said carrier, said reciprocating element normally moving in a path passing clear of the abutment, said actuating means including a cam on the said second shaft and means actuated by the cam upon completion of a revolution of said second shaft to shift the reciprocating element into a path where it contacts the said abutment to rock the carrier and advance the sensing contacts.

4. A mechanism as claimed in claim 3, comprising a second cam, means connected to said reciprocating element and engaging said second cam to reciprocate said reciprocating element once in each sensing cycle and phased so that sensing takes place when said reciprocating element is near its advanced position.

5. A mechanism as claimed in claim 3, wherein the said cam is arranged to maintain the reciprocating element in the path to contact the said abutment for a plurality of sensing cycles after the changeover of sectors.

6. In a digitiser for a clock including a shaft rotating in one direction to complete one revolution in twenty four hours mechanism for electrically sensing the position of the shaft comprising an element mounted on the shaft for rotation therewith and divided into twenty four equal sectors each having a characteristic set of electrical contacts, a carrier pivotally mounted for rocking movement about the axis of the shaft, sensing means including a set of sensing contacts mounted on the said carrier and co-operable successively with the sets of contacts on said element, stop means, spring means urging the carrier in the direction of rotation of the shaft towards the stop means to define a normal sensing position of the sensing contacts, an abutment on the carrier, a second shaft rotatable once per hour, cam means on the said second shaft, reciprocable means normally moving in a path to miss said abutment, means actuated by said cam means and co-operable with said reciprocable means to move said reciprocable means into a path wherein it contacts the said abutment to move the carrier against the spring means to advance the sensing contacts with respect to said element, the said cam means being phased with the shafts to move the reciprocable means into the abutment contacting path upon completion of rotation through one sector by said element whereby the sensing contacts unambiguously make with the contacts in the succeeding sector.

7. The structure as set forth in claim 6, further comprising a second cam, means connected to said reciprocable means and engaging said second cam to reciprocate said reciprocable means once per sensing cycle of one minute and phased with the sensing cycle so that the reciprocable means is in advanced position upon initiation of the sensing cycle.

References Cited by the Examiner

UNITED STATES PATENTS

| 2,808,447 | 10/1957 | Curtis | 200—24 X |
| 3,028,458 | 4/1962 | Strathearn et al. | 200—38 |
| 3,035,107 | 5/1962 | Matveeff et al. | 200—20 X |
| 3,168,630 | 2/1965 | Holzer | 200—38 X |

BERNARD A. GILHEANY, *Primary Examiner.*

H. M. FLECK, *Assistant Examiner.*